United States Patent
Onoe et al.

(10) Patent No.: US 6,942,914 B2
(45) Date of Patent: *Sep. 13, 2005

(54) DIELECTRIC RECORDING MEDIUM, AND METHOD OF AND APPARATUS FOR PRODUCING THE SAME

(75) Inventors: Atsushi Onoe, Tsurugashima (JP); Yasuo Cho, 4-5-304, Komegafukuro 2-chome, Aoba-ku, Sendai-shi, Miyagi-ken (JP)

(73) Assignees: Pioneer Corporation, Tokyo (JP); Yasuo Cho, Miyagi-ken (JP)

( * ) Notice: Subject to any disclaimer, the term of this patent is extended or adjusted under 35 U.S.C. 154(b) by 216 days.

This patent is subject to a terminal disclaimer.

(21) Appl. No.: 10/354,102

(22) Filed: Jan. 30, 2003

(65) Prior Publication Data

US 2003/0142620 A1 Jul. 31, 2003

(30) Foreign Application Priority Data

Jan. 31, 2002 (JP) ........................................ 2002-024671

(51) Int. Cl.$^7$ ................................................ B32B 3/02
(52) U.S. Cl. .................... 428/66.7; 428/64.4; 428/65.3; 428/192; 428/446; 428/69; 428/450
(58) Field of Search ............................... 428/64.4, 65.3, 428/192, 66.7, 446, 697, 450

(56) References Cited

U.S. PATENT DOCUMENTS 5,985,404 A * 11/1999 Yano et al. ................. 428/65.3
2003/0186090 A1 * 10/2003 Onoe et al. .................. 428/701

* cited by examiner

Primary Examiner—Deborah Jones
Assistant Examiner—Ling Xu
(74) Attorney, Agent, or Firm—Nixon & Vanderhye P.C.

(57) ABSTRACT

The dielectric material is, for example, a ferroelectric single crystal having a uniform thickness, and its one surface is used for a recording and reproducing surface on which a probe for recording and reproducing works. LiTaO$_3$ is used as the dielectric material. The conductive thin film, which is, for example, about 1000 to 2000 Å thick, is placed on a surrounding portion of a recording and reproducing surface, a back surface, and a side surface of the dielectric material. This conductive thin film, to which aluminum is added by a method of deposition, is connected to a common electrode of a recording and reproducing apparatus. The substrate is intended to preserve the dielectric material, which is thin, and it uses silicon or the like in a predetermined thickness, for example. A conductive paste is a material for sticking to the substrate the dielectric material having the conductive thin film thereon, and indium and silver paste are used for it.

7 Claims, 11 Drawing Sheets

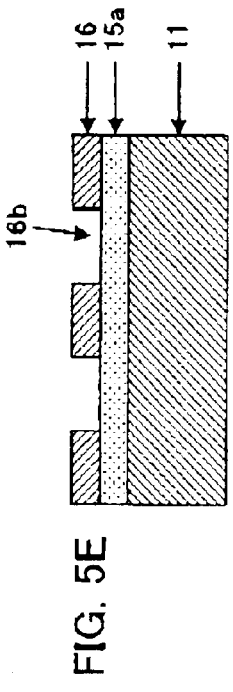
FIG. 5A
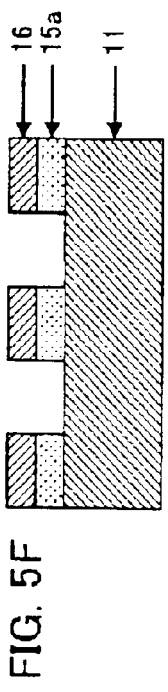
FIG. 5B
FIG. 5C
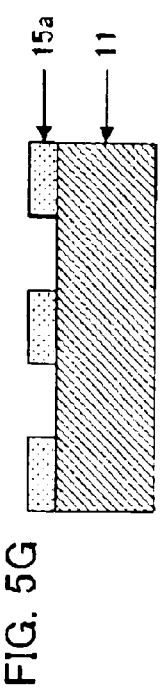
FIG. 5D
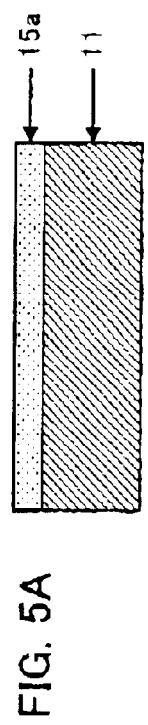
FIG. 5E
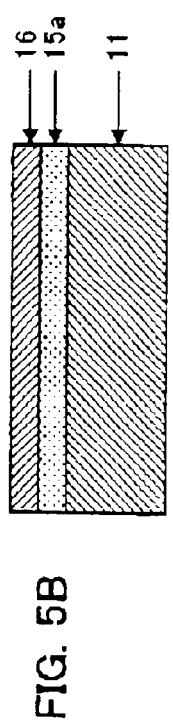
FIG. 5F
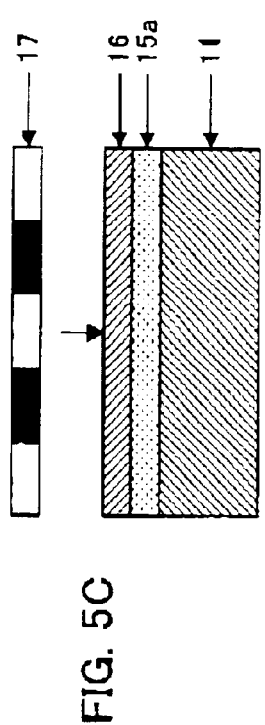
FIG. 5G
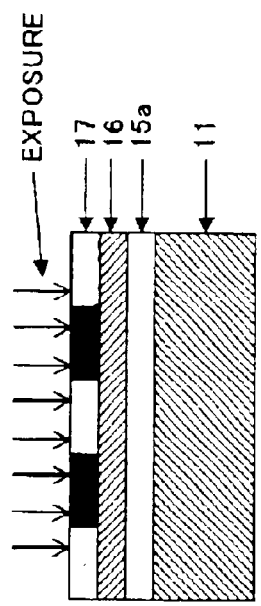

DIELECTRIC RECORDING MEDIUM, AND METHOD OF AND APPARATUS FOR PRODUCING THE SAME

BACKGROUND OF THE INVENTION

1. Field of the Invention

The present invention relates to a dielectric recording medium for recording information in a dielectric material or reproducing it, and a method of and an apparatus for producing the dielectric recording medium.

2. Description of the Related Art

Recently, many types of dielectric materials and piezoelectric materials have been developed, and most of them are used for ultrasonic elements, optical elements, a memory, and the like. In accordance with the fact, a method of measuring a remanent polarization distribution of the dielectric material and local anisotropy of the piezoelectric material has been developed. Also, by using this technique, another technique of recording information in the dielectric material and reproducing the information has been developed.

In order to record information in the dielectric material, a polarization direction of the polarization domain of the dielectric substance is formed such that the polarization direction corresponds to the information. For example, when using as a recording medium a ferroelectric bulk single crystal such as $LiTaO_3$, which has 180 degree domain, the Z-cut single crystal is mechanically grinded to prepare a thin film, and then, its back surface is applied onto a conductor substrate with a conductive paste to hold. The medium as formed above is used as a dielectric recording medium.

Alternatively, after the back surface of a crystal material of the dielectric substance is applied onto the conductor substrate with the conductive paste to hold, a thin film is formed by ion beam etching or the like from the side of the front surface. The medium as formed above is also used as the dielectric recording medium.

As described above, in order to record information in the high density in a microdomain, it is necessary to form the recording medium as thin as possible, as well as making the diameter of a probe for recording and reproducing small. Therefore, the thin film is conventionally prepared by the mechanical grind, the etching with ion beam, and the like.

However, the method by the mechanical grind is limited in thinning the medium on the order of several $\mu m$, even using an oblique grinding method of grinding a crystal with its back surface inclined slightly to the surface of a grinding apparatus. It is also difficult to make it thinner while keeping a stable form because the lack of crystal strength causes fracture.

Moreover, the etching by ion beam can make the film thinner than the mechanical grind can, but it is difficult to form the recording medium in uniform thickness while ensuring the reproducibility, and it takes a long time to complete.

SUMMARY OF THE INVENTION

It is therefore an object of the present invention to provide a dielectric recording medium having a recording device constructed by an extremely thin single dielectric material appropriate for high density recording, as well as a method of and an apparatus for producing the dielectric recording medium.

The above object of the present invention can be achieved by a dielectric recording medium for recording information in a dielectric material or reproducing the information provided with an electric conductor on a surrounding portion of a surface to record and reproduce on, the whole of a back surface, and a side surface of the dielectric material having a predetermined thickness.

According to the dielectric recording medium of the present invention, the electric conductor is formed except on the surface to record and reproduce on of the dielectric material having a uniform thickness, and further the electric conductor in a predetermined width is placed on the surrounding portion of the surface to record and reproduce on. These electric conductors are all electrically connected, and they are connected to a predetermined voltage, e.g. the ground. If a probe for recording or reproducing abuts on the surface and voltage is applied, a polarization domain is formed in the dielectric material on the basis of the electric field generated between the probe and the electric conductor placed on the back surface, and information is recorded. Moreover, a deviation from a record area is detected by the probe contacting to the electric conductor placed on the surrounding portion of the surface to record and reproduce on, and this is used as a signal for controlling an apparatus.

In one aspect of the dielectric recording medium of the present invention, the dielectric material is divided into a plurality of domains and the electric conductor is placed on the surrounding portion of a surface to record and reproduce on, the whole of a back surface, and a side surface in each of the divided domains.

According to this aspect, the surface to be recorded is divided into the plurality of domains, and the electric conductor separates between them. Such a structure that a plurality of record area is independently present makes it possible to record or reproduce a plurality of data at the same time, and such a structure causes its recording or reproducing rate to improve. Even if there is a record area with defects, the non-use of the area makes it possible to use the whole dielectric recording medium without scraping.

In another aspect of the dielectric recording medium of the present invention, the back surface of the dielectric material adheres to a substrate through the electric conductor placed on the back surface.

According to this aspect, the adhesion to the firm substrate with the electric conductor makes it possible to ensure the planarity of the recording surface and to substantially obtain the mechanical strength.

In another aspect of the dielectric recording medium of the present invention, the substrate is a silicon substrate.

According to this aspect, using the silicon substrate, which is chemically stable as a substrate and which hardly changes in shape thermally, gives a major effect on maintaining the planarity of the recording surface and protecting from mechanical destruction.

In another aspect of the dielectric recording medium of the present invention, a way of adhering to the substrate is a conductive paste.

According to this aspect, the electric conductor placed on the back surface of the dielectric material and the substrate is stuck by the conductive paste. As the conductive paste, indium and silver paste can be used with them dispersed in polymer. With respect to the electrical connection, it becomes possible to do that not directly from the thin electric conductor but through this conductive paste.

In another aspect of the dielectric recording medium of the present invention, the dielectric material is a ferroelectric material.

According to this aspect, the ferroelectric material is used as the dielectric material. The polarization domain becomes precise by the presence and the absence of recording, and the recording and the reproducing is well performed.

In another aspect of the dielectric recording medium of the present invention, the dielectric material is $LiTaO_3$.

According to this aspect, a Z-cut $LiTaO_3$ may be used as the dielectric material. Since the dielectric constant of $LiTaO_3$ is low, the polarization is easily reversed by the application of the electric field, the polarization domain becomes precise by the presence and the absence of recording, and the recording and the reproducing is well performed.

The above object of the present invention can be achieved by a method of producing a dielectric recording medium for recording information in a dielectric material or reproducing the information provided with: a mask pattern formation process of forming a mask pattern for setting an area for recording in the dielectric material; a first etching process of etching the dielectric material to be in a predetermined depth according to the formed mask pattern; a conductive thin film formation process of forming a conductive thin film over the whole surface etched by the first etching process; an adhesion process of sticking a surface on which the conductive thin film is formed to a substrate; a second etching process of etching the dielectric material from an opposite surface to a surface of the dielectric material adhering to the substrate; a measurement process of measuring an amount etched by the second etching process; and a control process of controlling the second etching process on the basis of an etching amount measured by the measurement process.

According to the method of producing the dielectric recording medium of the present invention, it becomes possible to mass-produce the ultrathin dielectric recording medium of the present invention in high quality and at a low price. The mask pattern formation process forms the mask for setting the area for recording on the surface of the dielectric material. A mask preparation method that is generally used may be used.

The first etching process etches the dielectric material to be a predetermined depth according to the mask pattern. This depth corresponds to the thickness of the recording medium.

The conductive thin film formation process forms the conductive thin film over the whole of the surface etched by the first etching process. This surface corresponds to the back surface of the dielectric material. A method of vacuum deposition, sputtering, CVD (Chemical Vapor Deposition), or the like can be used for forming the conductive thin film. This conductive thin film is connected to a predetermined voltage, e.g. the ground, and it causes the polarization domain to be generated in the dielectric material with the electric field generated by the voltage applied to a probe for recording between the probe and the conductive thin film.

The adhesion process sticks the surface on which the conductive thin film is formed to the substrate. A conductive paste can be used as a way of adhering. The adhesion of the dielectric material having the conductive thin film thereon to the firm substrate ensures the strength and the planarity.

The second etching process etches the dielectric material from the opposite surface to the surface of the dielectric material adhering to the substrate. This etching surface becomes a surface for recording. The etching is performed until the conductive thin film placed on the back surface is exposed. A surface of the conductive thin film appeared by this etching becomes the electric conductor surrounding the recording surface of the dielectric material.

The measurement process measures an amount etched by the second etching process, or it detects the fact that the conductive thin film is exposed. A magnetic device, an electric device, an optical device, and the like may be used for it.

The control process controls the second etching process on the basis of the result measured by the measurement process. If the fact that the conductive thin film is exposed is confirmed by this, the etching is ended.

In one aspect of the method of producing the dielectric recording medium of the present invention, the first etching process is an etching process by a dry etching device.

According to this aspect, the dry etching is used for etching the dielectric material on the basis of the mask pattern, with the record area left. It becomes possible to etch it accurately to be in a predetermined depth.

In another aspect of the method of producing the dielectric recording medium of the present invention, the second etching process is an etching process of grinding with a mechanical grind device.

According to this aspect, the dielectric material is quickly etched until reaching the conductive thin film.

In another aspect of the method of producing the dielectric recording medium of the present invention, the second etching process comprises: a grinding process of grinding the dielectric material by a mechanical grind device with a predetermined thickness left, and a dry etching process of etching the ground dielectric material by a dry etching device until reaching the conductive thin film formed by said conductive thin film formation process.

According to this aspect, as for the etching of the dielectric material until reaching the conductive thin film, firstly, the dielectric material can be quickly grinded by the mechanical grind with the predetermined thickness left, which does not reach the conductive thin film, and secondly, the dielectric material can be accurately etched by the dry etching, whose etching rate is slower than that of the mechanical grind and which can easily and accurately control the etching amount, until the conductive thin film appears In another aspect of the method of producing the dielectric recording medium of the present invention, the dry etching device used in the first or second etching process is an ECR (Electron Cyclotron Resonance) etching apparatus.

According to this aspect, the dielectric material is etched accurately by the ECR etching apparatus. Moreover, the use of the ECR etching apparatus enables good dry etching even of oxide materials such as $LiTaO_3$.

In another aspect of the method of producing the dielectric recording medium of the present invention, the measurement process is a measurement process by emission spectrum analysis.

According to this aspect, when the etching of the dielectric material proceeds and if the composition of the conductive thin film becomes included in the emission spectrum of plasma, this means that the conductive thin film is exposed, and the etching ends. The use of the emission spectrum controls the etching by the ECR etching apparatus accurately and effectively.

The above object of the present invention can be achieved by an apparatus for producing a dielectric recording medium for recording information in a dielectric material or reproducing the information provided with: a mask pattern formation device for forming a mask pattern for setting an area for recording in the electric material; a first etching device for etching the dielectric material to be in a predetermined depth according to the formed mask pattern; a conductive thin film formation device for forming a conductive thin film over the whole surface etched by the first etching device; an adhesion device for sticking a surface on which the conductive thin film is formed to a substrate; a second etching device for etching the dielectric material from an opposite surface to a surface of the dielectric material adhering to the substrate; a measurement device for measuring an amount etched by the second etching device; and a control device for controlling the second etching device on the basis of an etching amount measured by the measurement device.

According to the apparatus for producing the dielectric recording medium of the present invention, it becomes possible to mass-produce the dielectric recording medium of the present invention in high quality and at a low price.

The mask pattern formation device forms the mask for setting the area for recording on the surface of the dielectric material. A general-purpose device for mask pattern formation can by used.

The first etching device etches the dielectric material to be a predetermined depth according to the mask pattern. The conductive thin film formation device forms the conductive thin film over the whole of the surface etched by the first etching device. The surface on which the conductive thin film is formed becomes the back surface of the dielectric material. An apparatus of vacuum deposition, sputtering, CVD, or the like can be used for forming the conductive thin film.

The adhesion device sticks the surface on which the conductive thin film is formed to the substrate. It adheres to the substrate with a conductive paste in which indium and aluminum are dispersed in polymer, for example. As the substrate, for example, silicon is used, to ensure the planarity and the strength of the recording surface of the dielectric material.

The second etching device etches the dielectric material from the opposite surface to the surface of the dielectric material adhering to the substrate. This surface becomes a surface for recording. The etching is performed until reaching the conductive thin film placed. A surface of the conductive thin film appeared by this etching becomes the electric conductor surrounding the recording surface of the dielectric material.

The measurement device measures an amount etched by the second etching device, or it detects whether or not the etching reaches the conductive thin film. A magnetic device, an electric device, an optical device such as emission spectrum analysis and ellipsometry, and the like may be used for it.

The control device controls the second etching device on the basis of the result measured by the measurement device. Because of this, it is possible to control the etching device accurately until the conductive thin film appears on the recording surface.

In one aspect of the method of producing the dielectric recording medium of the present invention, the second etching device is provided with a mechanical grind device and a dry etching device.

According to this aspect, as for the etching of the dielectric material until reaching the conductive thin film, firstly, the dielectric material can be quickly grinded by the mechanical grind device with the predetermined thickness left, which does not reach the conductive thin film, and secondly, the dielectric material can be accurately etched by the dry etching, until the conductive thin film appears.

The nature, utility, and further features of this invention will be more clearly apparent from the following detailed description with reference to preferred embodiments of the invention when read in conjunction with the accompanying drawings briefly described below

BRIEF DESCRIPTION OF THE DRAWINGS

FIG. 5A to FIG. 5G are schematic diagrams showing one example of the preparation of the mask pattern used when setting the record area of the dielectric recording medium;

DETAILED DESCRIPTION OF THE PREFERRED EMBODIMENTS (First Embodiment Associated with the Dielectric Recording Medium)

Figure 1A:
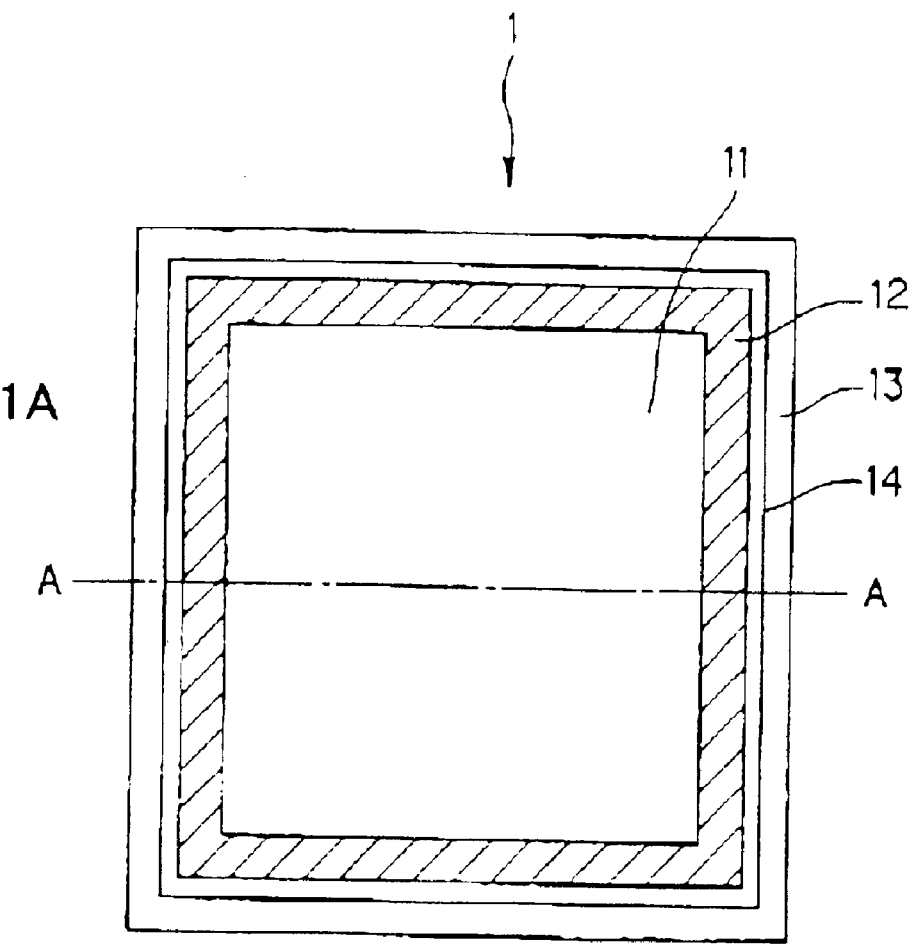
FIG. 1A is a plan view showing a first embodiment of the dielectric recording medium of the present invention.
Figure 1B:
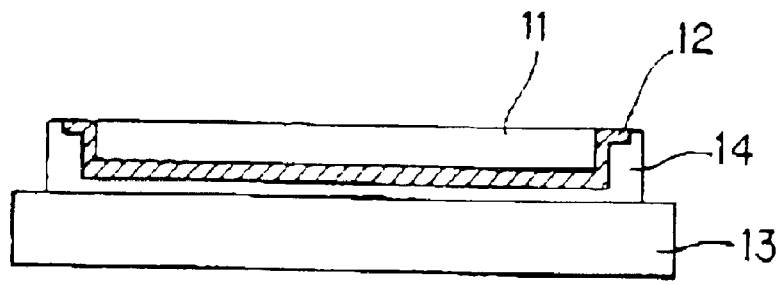
FIG. 1B is an A—A cross sectional side view of FIG. 1A.

The first embodiment of the dielectric recording medium of the present invention will be explained with reference to FIG. 1A and FIG. 1B. FIG. 1A is a plan view showing a first embodiment of the dielectric recording medium of the present invention. FIG. 1B is an A—A cross sectional side view of FIG. 1A.

A dielectric recording medium 1 is provided with a dielectric material 11, a conductive thin film 12, a substrate 13, and a conductive paste 14, as shown in FIG. 1.

The dielectric material 11 is, for example, a ferroelectric single crystal having a uniform thickness, and its one surface is used for a recording and reproducing surface on which a probe for recording and reproducing works. The thickness is about 500 Å, for example, and $LiTaO_3$ is used as the material. As the other dielectric materials, the following is conceivable: a PZT material as being a solid solution of $PbTiO_3$—$PbZrO_3$; lead titanate represented as $PbTiO_3$; lead zirconate represented as $PbZrO_3$; barium titanate represented as $BaTiO_3$; lithium niobate represented as $LiNbO_3$; a PLZT material as being a solid solution of lead (Pb), lantern (La), zirconium (Zr), and titanium (Ti); a BNPB material as being a solid solution of bismuth (Bi), sodium (Na), lead (Pb), and barium (Ba); and the like.

The conductive thin film 12, which is about 1000 to 2000 Å thick, is placed on a surrounding portion of the recording and reproducing surface of the dielectric material 11, except on the surface. This conductive thin film 12, to which metal such as aluminum or the like is added by a method of vacuum deposition, sputtering, CVD, or the like, is connected to the ground of a recording and reproducing apparatus.

The substrate 13 is intended to preserve the dielectric material 11, which is thin, and maintain the planarity. It uses silicon or the like in a predetermined thickness, for example.

The conductive paste 14 is a material for sticking to the substrate 13 the dielectric material 11 having the conductive thin film 12 thereon, and indium and silver paste are used for it. Moreover, other adhesives and adhesive methods may be used.

Furthermore, in order to ensure the convenience of handling the dielectric recording medium 1 having this structure and its strength, a material of plastic, ceramics, or the like may be used to surround it except the recording and reproducing surface for packaging.

The action of the dielectric recording medium 1 having the above described structure as a recording medium is as follows. When voltage is applied on a probe that abuts on the recording and reproducing surface of the dielectric material 11, electric field is generated between the probe and the conductive thin film 12, which is the back surface of the dielectric material 11, and the portion on which the probe abuts is polarized. By having this polarization reached to the back of the dielectric material 11, a stable polarization domain is formed, and information is recorded in it. On the other hand, with respect to the reproduction, by having the probe abutted on the recording and reproducing surface for tracing, a minute volume change corresponding to the polarization is detected, for example, by a nonlinear microscope method, and the recorded information is reproduced In this case, if the whole medium is initialized in advance to a + surface or a − surface, S/N ratio improves.

(Second Embodiment Associated with the Dielectric Recording Medium)

Figure 2A:
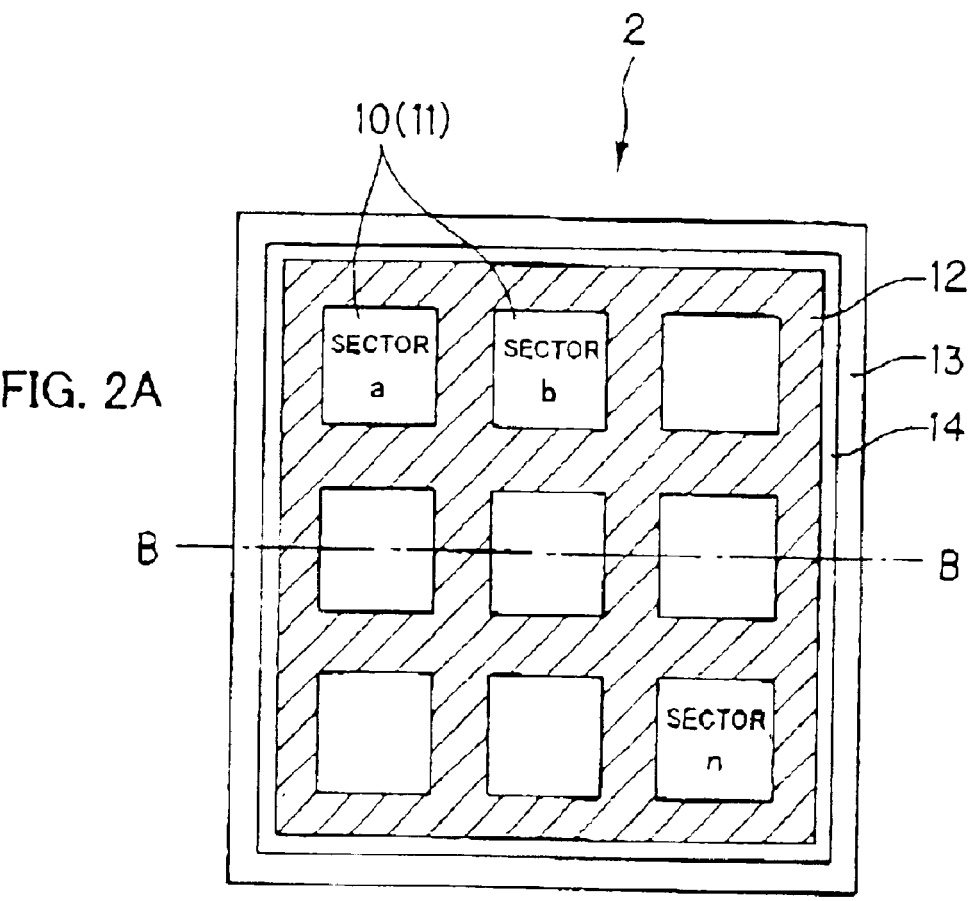
FIG. 2A is a plan view showing a second aspect of the dielectric recording medium of the present invention.
Figure 2B:
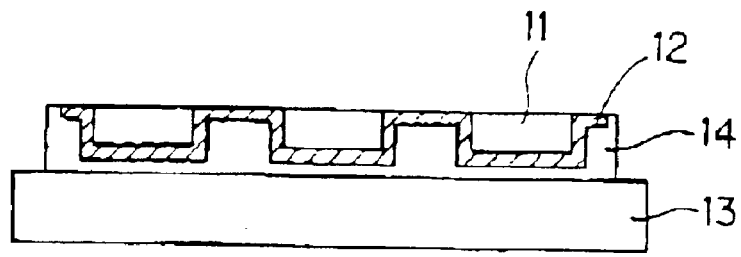
FIG. 2B is a B—B cross sectional side view of FIG. 2A.

The second embodiment of the dielectric recording medium of the present invention will be explained with reference to FIG. 2A and FIG. 2B. FIG. 2A is a plan view showing a second embodiment of the dielectric recording medium of the present invention. FIG. 2B is a B—B cross sectional side view of FIG. 2A.

A dielectric recording medium 2 is provided with a plurality of sectors 10 constructed by the dielectric material 11, the conductive thin film 12, the substrate 13, and the conductive paste 14, as shown in FIG. 2.

Recording surfaces are disposed with the sectors 10 separated into a plurality of islands of a sector 10a to a sector 10n, and each of the sectors 10 is surrounded, except its recording and reproducing surface, by the conductive thin film 12. The island formation is not limited to being square as shown in FIG. 2A and FIG. 2B, and it may be round, rectangular, or concentrically round. The number of it is not specifically limited.

The dielectric recording medium 2 having the plurality of the dielectric materials 11 placed therein becomes able to record and reproduce plurality of information at once by setting probes corresponding to the respective sectors 10, and thus its recording and reproducing rate improves.

Other structures, functions, actions, and the like are the same as those related to the above described dielectric recording medium 1, and their explanation is omitted.

(Embodiment Associated with a Method of Producing the Dielectric Recording Medium)

Next, the method of producing the electric recording medium will be explained with reference to FIG. 3 to FIG. 7. Here, a method of producing the electric recording medium 2, on which the plurality of sectors 10 are disposed for recording, as shown in FIG. 2, will be described, but obviously the same method is available to prepare the dielectric recording medium 1 provided with one record area as a whole as shown in FIG. 1.

Figure 3A:
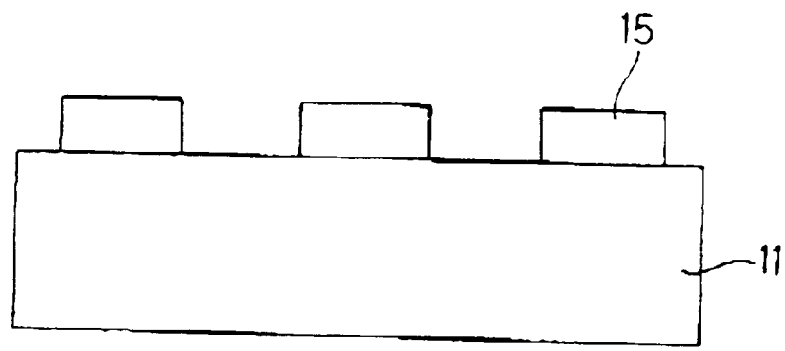
FIG. 3A to FIG. 3C are schematic diagrams showing a process of producing the dielectric recording medium of the present invention, FIG. 3A showing the condition that a mask pattern for setting a record area is applied to a dielectric material, FIG. 3B showing the condition of being etched, and FIG. 3C showing the condition that a conductive thin film is formed on the etched surface.
Figure 3B:
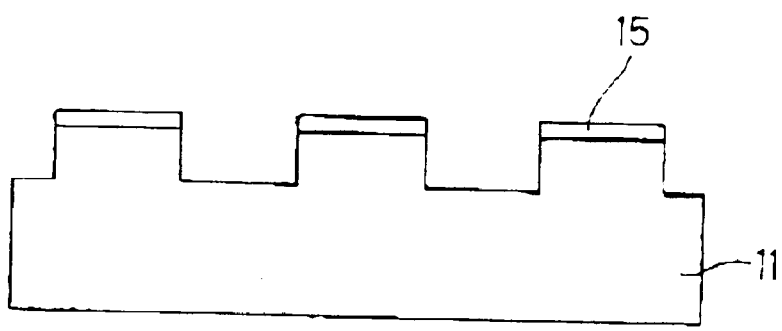
Figure 3C:
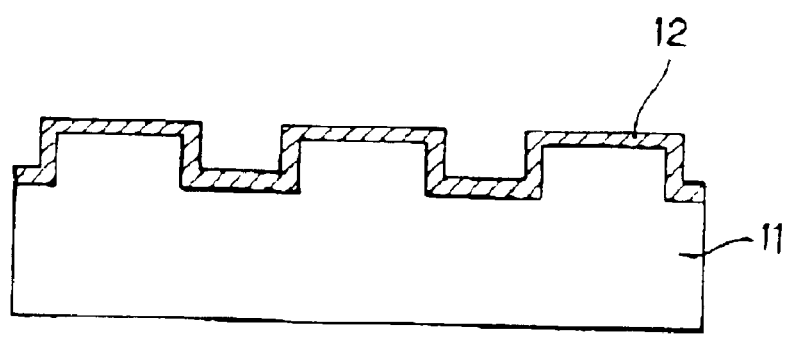
Figure 4A:
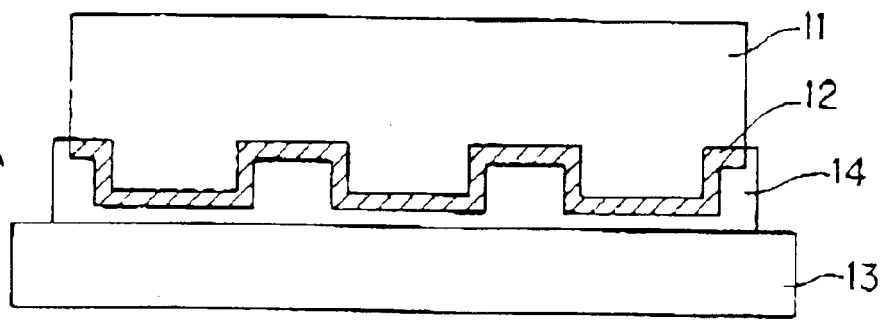
FIG. 4A to FIG. 4C are schematic diagrams showing a process of producing, which follows FIG. 3C, FIG. 4A showing the condition that the surface forming the conductive thin film is applied to a substrate, FIG. 4B showing the condition that the dielectric material is grinded by mechanical grind, and FIG. 3C showing the condition that the dielectric material is etched by plasma etching after the mechanical grind.
Figure 4B:
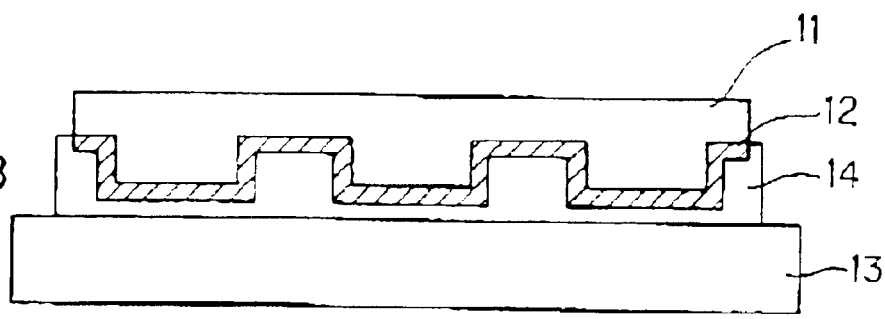
Figure 4C:
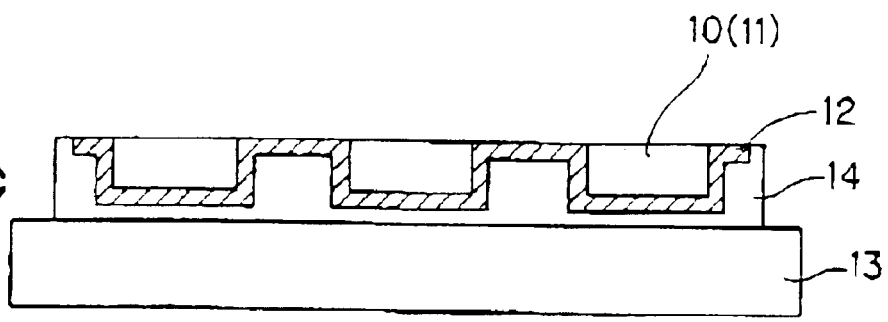
Figure 6:
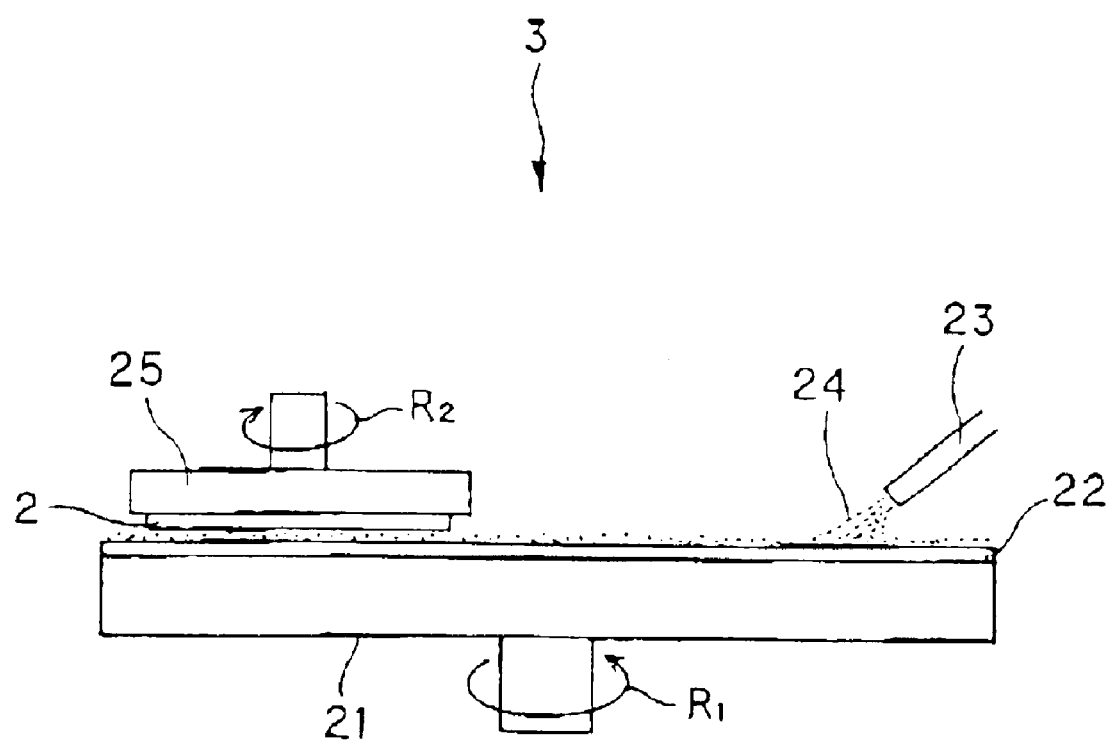
FIG. 6 is a schematic diagram showing one example of a mechanical grind apparatus.
Figure 7:
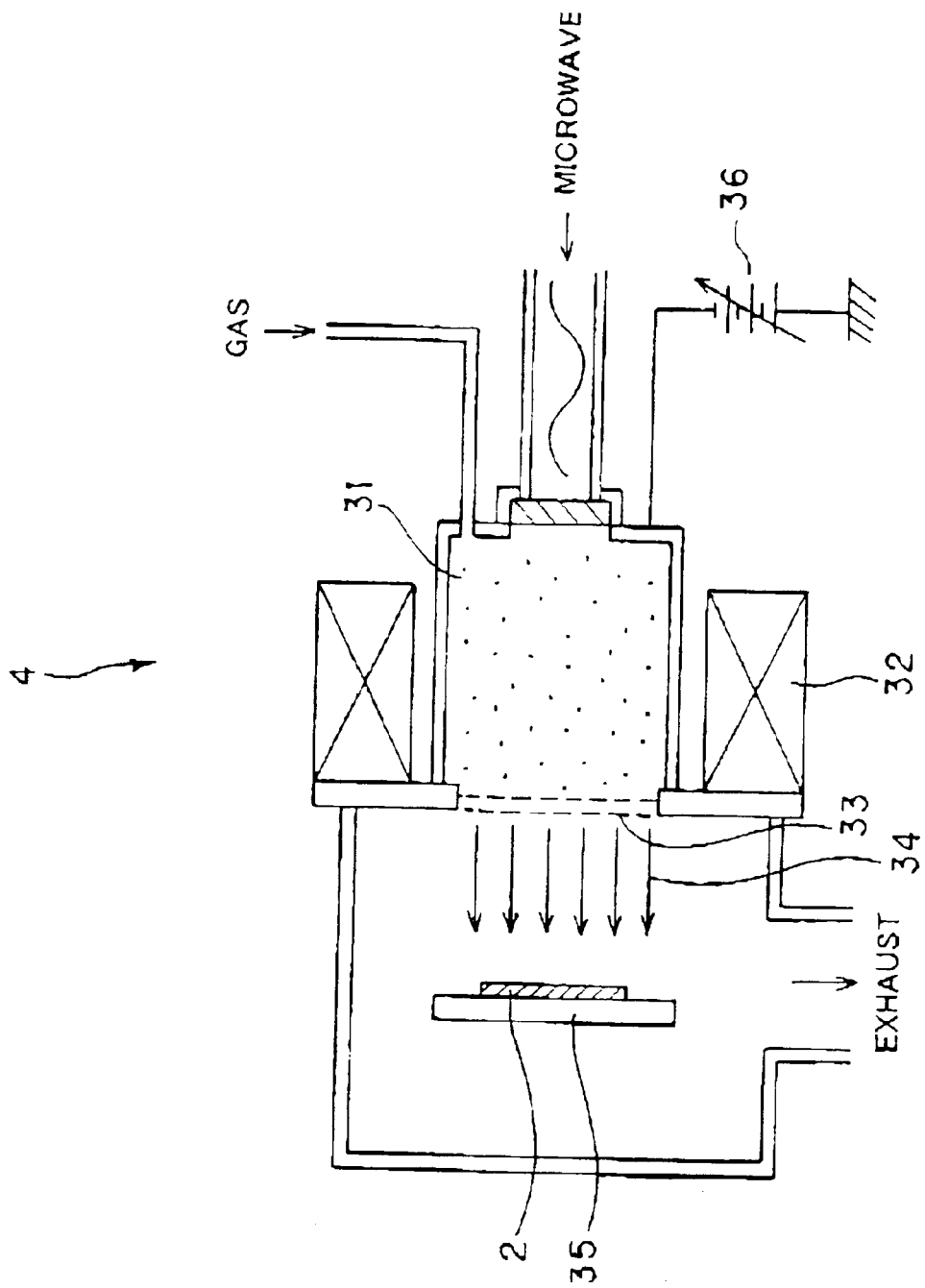
FIG. 7 is a schematic diagram showing an ECR etching apparatus as one example of a dry etching apparatus.

FIG. 3A to FIG. 3C are schematic diagrams showing a process of producing the dielectric recording medium. FIG. 4A to FIG. 4C are schematic diagrams showing a process of producing, which follows FIG. 3C. FIG. 5A to FIG. 5G are schematic diagrams showing one example of the preparation of the mask pattern used when setting the record area of the dielectric recording medium. FIG. 6 is a schematic diagram showing one example of a mechanical grinding apparatus. FIG. 7 is a schematic diagram showing an ECR etching apparatus as one example of a dry etching apparatus.

Firstly, a mask 15 for setting the domain of the sectors 10 is formed on the dielectric recording medium 11 which is mirror-grinded as shown in FIG. 3A. This mask 15 is formed by using metal such as aluminum or the like, dry film resist, or the like. As for the mask 15, as explained later with reference to FIG. 5, the one prepared by a generally used mask pattern method is used. For example, a resist pattern is formed through the processes of laying a photo mask corresponding to the pattern of the mask 15 on a resist which is directly applied onto the dielectric material 11, exposing, developing, dissolving an unexposed portion, and the like. Moreover, the mask 15 is formed by pattern-printing the resist pattern by a method of dry etching, a lift off method, or the like onto the metal film formed by a device of deposition, sputtering, or the like. Here, the case that about 8000 Å aluminum film is used for the mask for dry etching, will be described.

Secondly, as shown in FIG. 3B, the dielectric material 11 on which the mask 15 is disposed is etched from its top except portions that will be the sectors 10 of the dielectric material 11 to be in a predetermined depth. As the etching, for example, an ECR (Electron Cyclotron Resonance) etching apparatus, which is dry etching, is used. This apparatus etches portion other than the sectors 10 of the dielectric material 11 to be about 5000 Å deep, and it etches aluminum to be about 1000 to 2000 Å thick. The end point of the etching is detected by the change of a plasma condition or the like, by using a measurement of discharge impedance, absorption spectrum analysis, emission spectrum analysis of plasma, gas chromatography measurement, and the like, by the change of the types and the amounts of decomposition and reaction products.

Then, the conductive thin film 12 is formed in a predetermined thickness on the surface etched as described above.

This conductive thin film 12 is also formed on the sidewall etched, so that it covers the whole etched surface of the dielectric material 11. The conductive thin film 12 is formed by using a predetermined method, such as a method of vacuum deposition, CVD, sputtering, or the like, and its thickness is controlled by a measurement of electric resistance, a time control by the deposition or the growing rate of the thin film, or the like. The material forming the conductive thin film 12 is aluminum here, but other metal may be used as well.

The conductive thin film 12 is connected to the ground of the recording and reproducing apparatus, and it generates electric field in the dielectric material 11 between this film and the probe for recording and reproducing. By the electric field by the voltage applied to this probe, the polarization domain is formed at the portion of the dielectric material 11 that the probe abuts on, and information is recorded. Moreover, it is possible to implant the dielectric substance at the ⊔ portion of the formed conductive thin film 12 and make the surface flat to provide it to the following processes for convenience.

Then, as shown in FIG. 4A, the conductive paste 14 is applied onto the conductive thin film 12 to adhere to the substrate 13. In the conductive paste 14, particles of indium, silver, or the like are dispersed with thermosetting resin as binder polymer. Other adhesives and adhesive methods may be also used. The substrate 13 is silicon, for example, and it is also possible to use plastic, ceramics, or the like.

Then, as shown in FIG. 4B, the dielectric material 11 is grinded by a mechanical grinding apparatus as shown in FIG. 6 to be in a predetermined thickness, for example, about 50 μm. The thickness of grinding can be controlled by detecting the position of a mechanical portion corresponding to the thickness of grinding by using an electric, magnetic, or optical scale. Of course, the amount of grinding may be controlled by administering grinding time length.

Lastly, as shown in FIG. 4C, the dielectric material 11 is finely etched by dry etching until the conductive thin film is exposed after the mechanical grind shown in FIG. 4B. This exposed surface of the conductive thin film 12 becomes the surface of the sectors 10. As the dry etching, the ECR etching apparatus is used, for example. The end point of the etching is detected by the change of a plasma condition or the like, by using a measurement of discharge impedance, absorption spectrum analysis, emission spectrum analysis of plasma, gas chromatography measurement, and the like, by the change of the types and the amounts of decomposition and reaction products, which is the same as described above.

Incidentally, if the mechanical grind keeps accurate until the conductive thin film 12 is exposed, the production of the dielectric recording medium 2 ends in the process of FIG. 4B.

Then, one example of a preparation method of the mask 15 used for the production of the dielectric recording medium 2 of the present invention, as shown in FIG. 3A to FIG. 4C, will be explained with reference to FIG. 5A to FIG. 5G. This is one example of the mask preparation by the dry etching method, but if the mask 15 that is similar is formed, obviously, other methods can be used, as well.

Firstly, as shown in FIG. 5A, an aluminum film 15a, which is about 8000 Å thick, is formed on the dielectric material 11 by a method of deposition, sputtering, or the like. Secondly, as shown in FIG. 5B, a resist 16 is applied onto the aluminum film 15a. Then, as shown in FIG. 5C, a photomask 17 having a pattern corresponding to the sectors 10 of the dielectric recording medium 2 is placed on the resist 16, and it is exposed as shown in FIG. 5D. Then, as shown in FIG. 5E, it is developed and an unexposed portion is removed by dissolving. A numeral reference 16b shows the removed portion, and it corresponds to the ⊔ portion in FIG. 3B. Then, as shown in FIG. 5F, the resist pattern is printed to the aluminum film 15a by dry etching the aluminum in plasma, which is mainly chlorine gas. Then, as shown in FIG. 5G, by removing the resist pattern, the mask 15 is prepared with the portion corresponding to the sectors 10 of the dielectric recording medium 2 opening. Incidentally, as the mask 15 for the ECR dry etching, it is possible to perform direct pattern formation to a dry resist film in addition to the above described pattern printing to the aluminum film.

Next, the mechanical grind used for the method of producing the dielectric recording medium of the present invention will be explained. As shown in FIG. 6, the dielectric recording medium is grinded by dropping a liquid in which abrasive particles are dispersed, i.e. an abrasive 24, from a nozzle 23 on an abrasive pad 22 which is applied on an abrasive table 21, pressing to the abrasive pad 22 the dielectric recording medium 2 placed on a turntable 25, and spinning the abrasive table 21 and the turntable 25 as shown with arrows R1 and R2. The used abrasive particles are minute silica particles, alumina particles, or the like, whose size is about several hundreds Å. Moreover, with respect to the liquid which disperses the abrasive particles, pH adjustment, mixing an electrolyte, dispersing the abrasive particles, a state of aggregation, and the like are controlled by the abrasive particles and the dielectric material 11 to be grinded.

Next, the ECR etching apparatus used for the method of producing the dielectric recording medium of the presentation will be explained. As shown in FIG. 7, a gas such as Ar or the like is fed into a plasma generator 31, and an about 2.5 GHz microwave is applied. To the plasma generator 31, minus DC voltage is applied, and plasma is generated. This plasma moves according to the axial distribution of magnetic field formed by an electromagnet 32 placed around the circumference of the plasma generator 31, it accelerates in parallel by an extraction electrode 33, and it collides with the dielectric recording medium placed on a holder 35. The dielectric material 11 is etched by the collision energy. Since the condition of the etching differs in the collision angle of the plasma, it is designed such that the magnetic field around the holder 35 has parallel magnetic field distribution and that the dielectric material 11 is irradiated with the plasma fluid, which is a high current and which is parallel.

Figure 8:
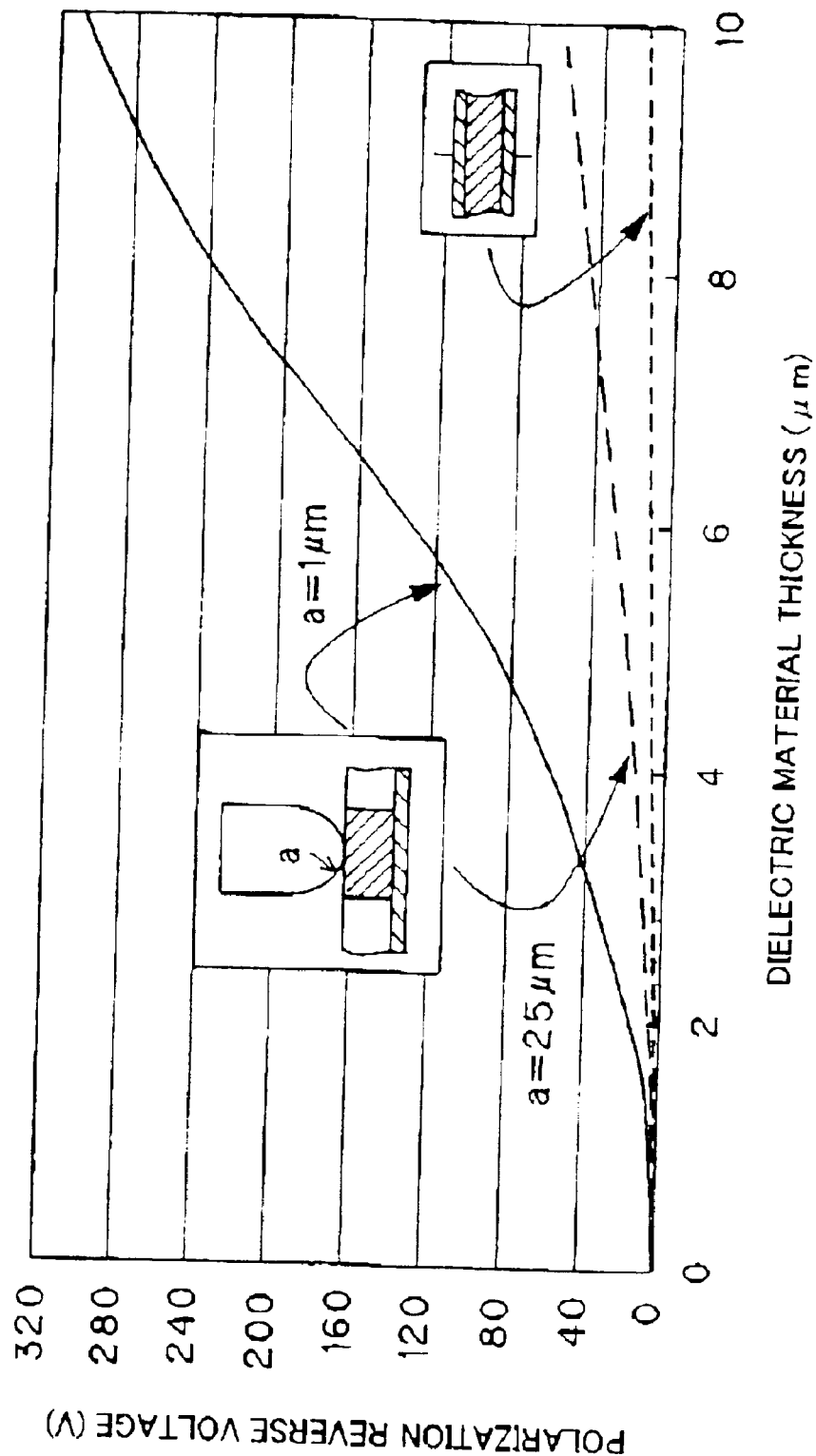
FIG. 8 is a schematic diagram showing a relationship between a thickness of the dielectric substance and a minimum voltage, which reverses a polarization domain, with a probe radius as a parameter, in the case of using a Z-cut $LiTaO_3$ single crystal as a recording material.

FIG. 8 is a schematic diagram showing a relationship between a thickness of the dielectric substance and a minimum voltage, which reverses a polarization domain, with a probe shape as a parameter, in the case of using a Z-cut LiTaO$_3$ single crystal as the dielectric substance. Our research shows that there is a similarity among the probe shape, the thickness of the dielectric recording medium, domain size, reverse voltage in the polarization domain, and the like. Moreover, since the polarization domain corresponding to the record is formed substantially in the same size as the diameter of the probe, the diameter is preferably made small for high density recording. On the other hand, as for the voltage producing the polarization domain, it is learned that as the dielectric material 11 is thicker, the higher voltage to be applied is necessary, according to FIG. 8. Especially, as the diameter of the probe becomes smaller, the applied voltage corresponding to the thickness of the dielectric material 11 increases more rapidly. Therefore, to make the applied voltage low, e.g. about 10 V, it is necessary to thin down the dielectric material 11, e.g. about 5000 Å. The method of producing the dielectric recording medium of the present invention realizes this.

With the above described method, in the dielectric recording medium of the present invention, the ferroelectric single crystal can be an ideal ultrathin material, and uniform and large-scale production becomes possible.

(Embodiment Associated with an Apparatus for Producing the Dielectric Recording Medium)

Figure 9:
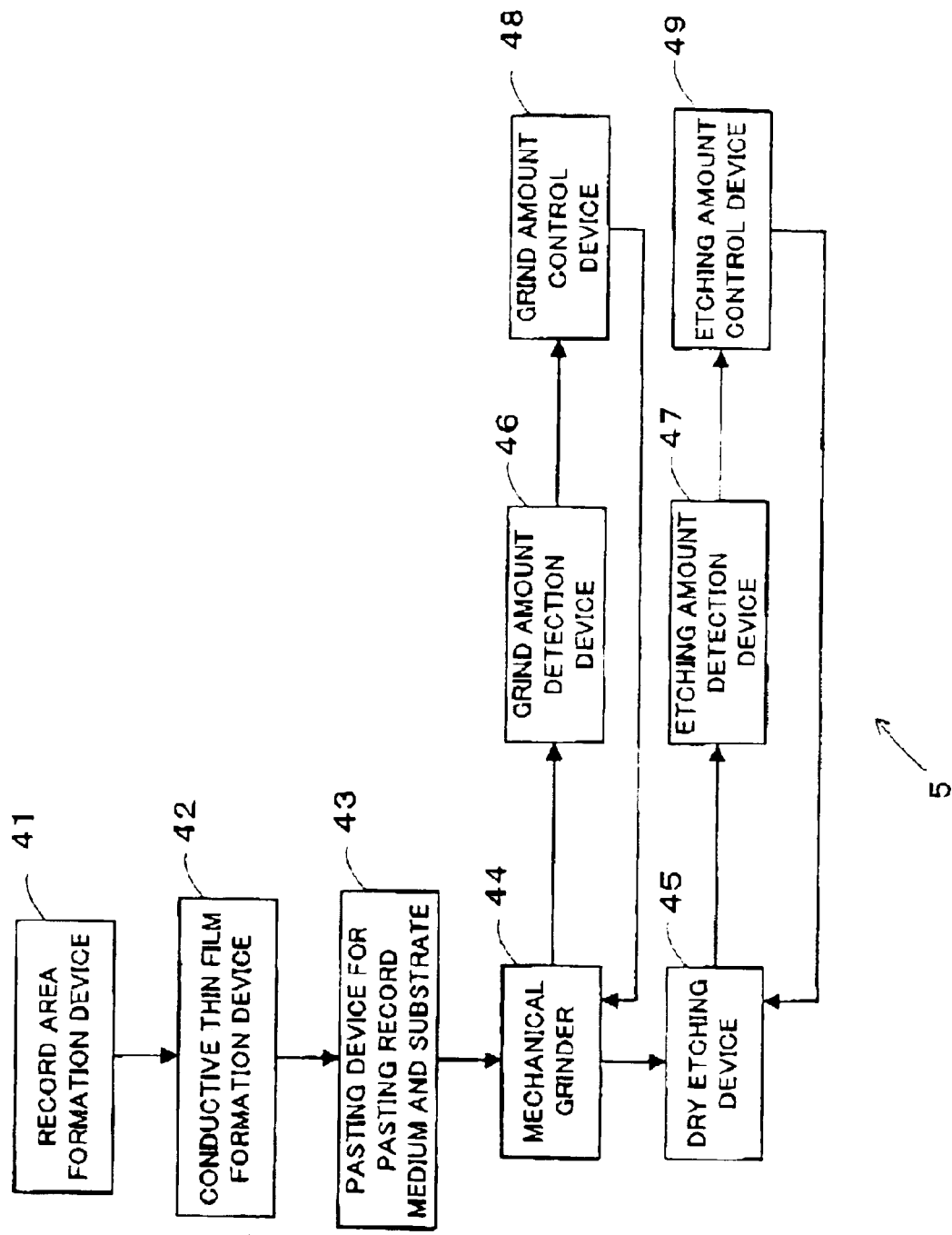
FIG. 9 is a block diagram of an apparatus for producing the dielectric recording medium associated with the present invention.

The apparatus for producing the dielectric recording medium of the present invention is provided with: a record area formation device 41; a conductive thin film formation device 42; a pasting device 43 for pasting the recording medium and the substrate; a mechanical grinder 44; a dry etching device 45; a grind amount detection device 46; an etching amount detection device 47; a grind amount control device 48; and an etching amount control device 49, as shown in FIG. 9.

The record area formation device 41 sets the shape of the dielectric material 11 shown in FIG. 1 and the installation and the shape of the sectors 10 shown in FIG. 2. The mask is prepared by a general-purpose photomask production technique, and this mask pattern is printed to the surface constituting the recording surface of the dielectric material 11. Then, it is etched by the ECR etching apparatus or the like with the recording portion left until reaching a predetermined depth, e.g. about 5000 Å. This depth corresponds to the thickness of the recording portion. This etching amount is controlled by detecting the change of a plasma condition or the like, by using a measurement of discharge impedance, absorption spectrum analysis, emission spectrum analysis of plasma, gas chromatography measurement, and the like, by the change of the types and the amounts of decomposition and reaction products.

The conductive thin film formation device 42 forms the conductive thin film 12 in a predetermined thickness on the whole surface etched at the record area formation 41. This conductive thin film 12 is also formed on the sidewall etched, so that it covers the whole surface of the dielectric material 11. The conductive thin film 12 is formed by using a predetermined apparatus, such as an apparatus of vacuum deposition, CVD, sputtering, or the like, and its thickness is controlled by a measurement of electric resistance, a time control by the deposition or the growing rate of the thin film, or the like. The material forming the conductive thin film 12 is aluminum here, but other metal may be used as well.

The pasting device 43 for pasting the recording medium and the substrate applies the conductive paste 14 onto the conductive thin film 12, thereby to adhere to and fix on the substrate 13. The conductive paste 14 uses a paste of indium, silver, or the like. If an electrode can be directly extracted from the conductive thin film 12, other adhesives, such as indium solder or the like, can be used instead of using the conductive paste 14.

The mechanical grinder 44 is a mechanical grind device as shown in FIG, 6 described above, and it grinds the dielectric material 11 until reaching a predetermined thickness, e.g. about 50 $\mu$m. The mechanical grinder 44 is used to efficiently grind the dielectric material 11.

The dry etching device 45 finely etches it until the conductive thin film is exposed after the mechanical grind. As the dry etching, the ECR etching apparatus is used, for example.

The grind amount detection device 46 detects the amount grinded by the mechanical grind device, and its value is served as controlling the mechanical grind amount. As the detection device, it is possible to use a device for detecting the position of a mechanical portion corresponding to the thickness of grinding by using an electric, magnetic, or optical scale.

The etching amount detection device 47 detects the amount etched by the dry etching, and its value is served as controlling the dry etching. The end point of the etching can be detected by the change of a plasma condition or the like, by using a measurement of discharge impedance, absorption spectrum analysis, emission spectrum analysis of plasma, gas chromatography measurement, and the like, by the change of the types and the amounts of decomposition and reaction products.

The grind amount control device 48 controls the operation of the mechanical grinder 44, on the basis of the grind amount of the grind amount detection device 46. This is intended to set the final etching amount by the dry etching, and as the etching amount by the dry etching is smaller, the production time shortens more. However, since the mechanical grind is rough, it is necessary to control not to damage the conductive thin film 12.

The etching amount control device 49 controls the final etching amount until the conductive thin film 12 is exposed. It controls, for example, the ECR etching apparatus, on the basis of detection data of the etching amount detection device 47.

(Embodiment of an Information Recording and Reproducing Apparatus Using the Dielectric Recording Medium of the Present Invention)

Figure 10:
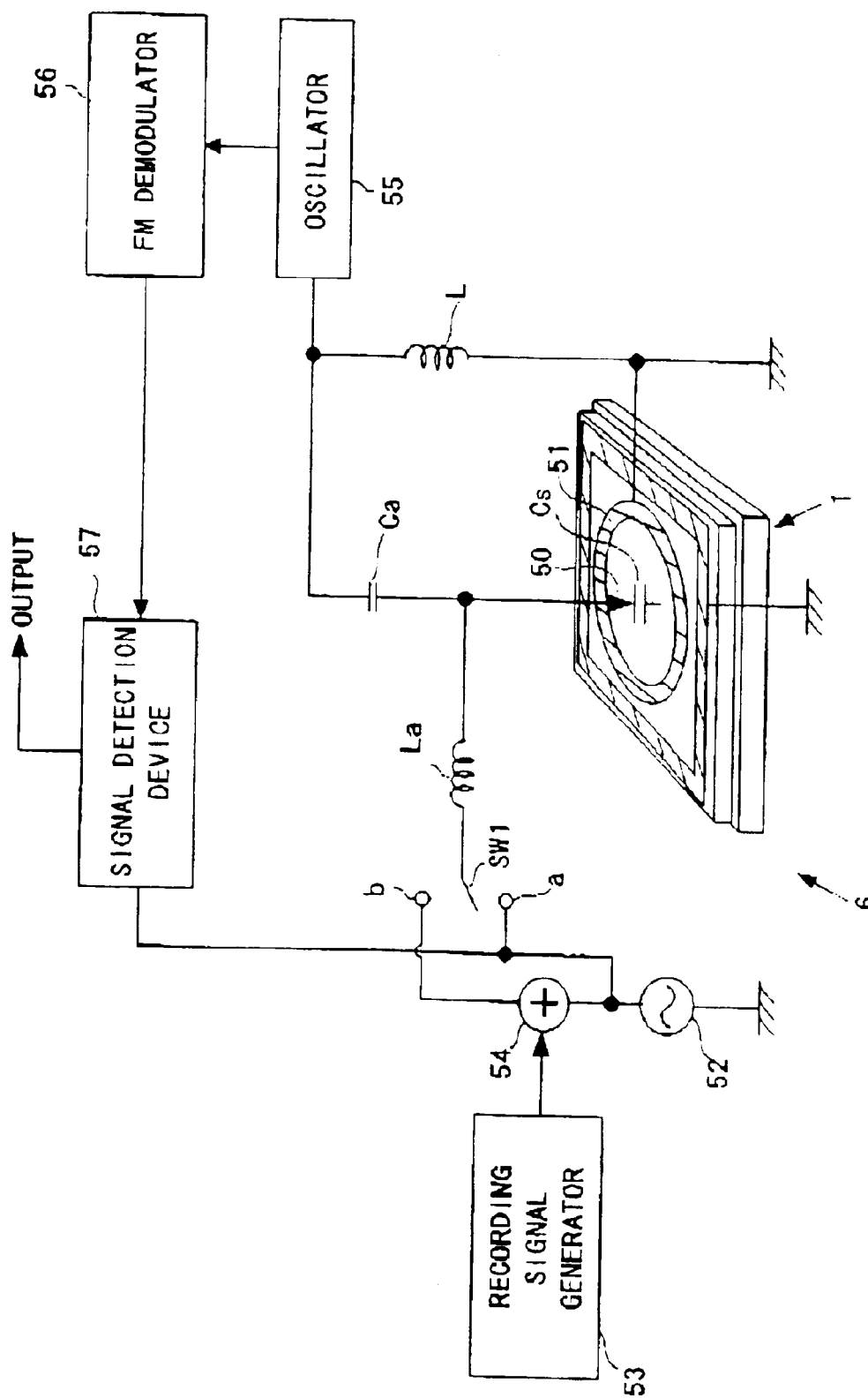
FIG. 10 is a schematic diagram showing one example of an information recording and reproducing apparatus using the dielectric recording medium associated with the present invention.
Figure 11:
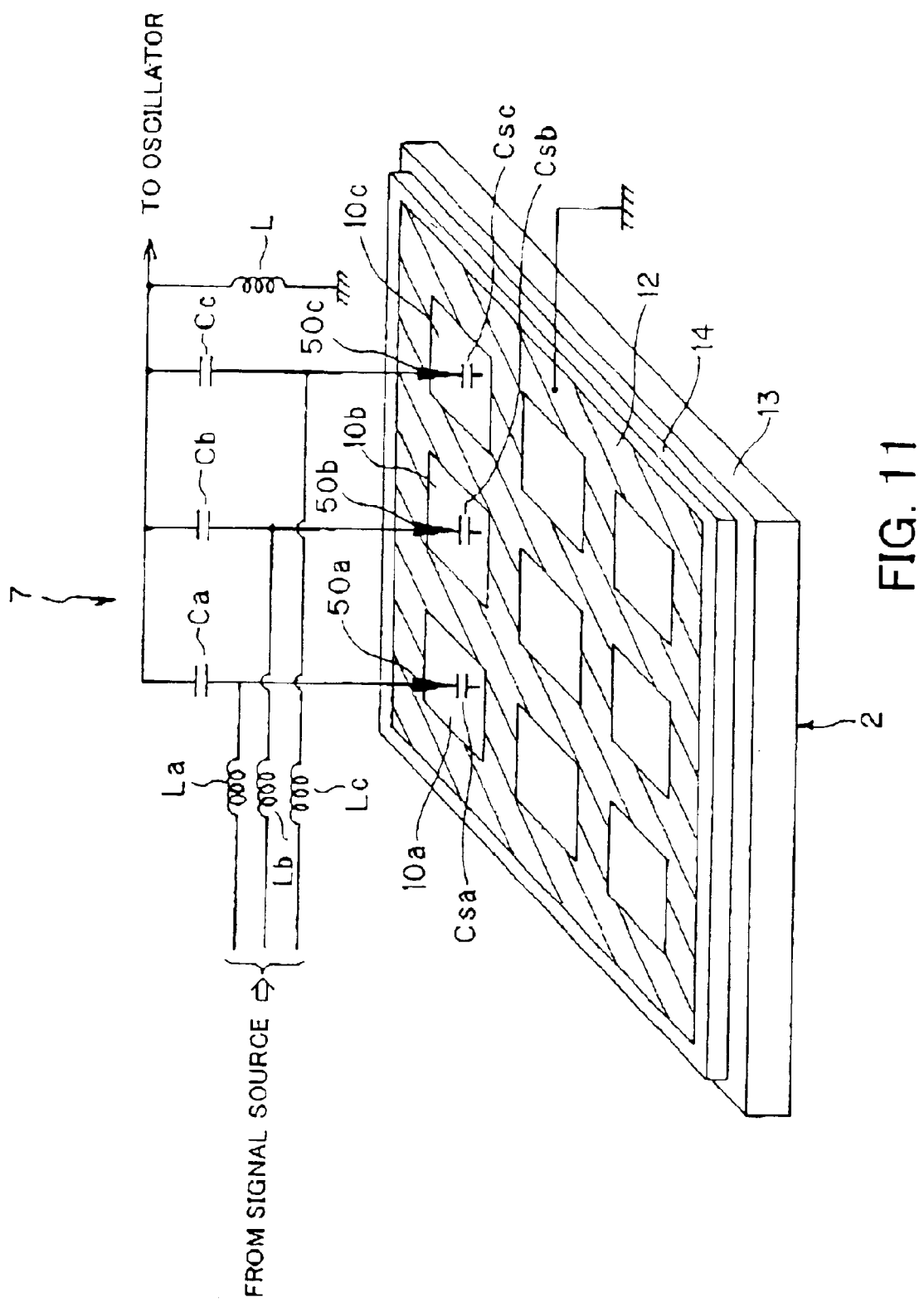
FIG. 11 is a schematic diagram showing one example of an information recording and reproducing apparatus using the dielectric recording medium having a plurality of sectors associated with the present invention.

Next, an information recording and reproducing apparatus 6 using the dielectric recording medium of the present invention will be explained with reference to FIG. 10 and FIG. 11. FIG. 10 is a schematic diagram showing a block structure of the information recording and reproducing apparatus using the dielectric recording medium 1. FIG. 11 is a schematic diagram showing the relationship between the sectors 10 and a probe of the information recording and reproducing apparatus using the dielectric recording medium 2 having a plurality of sectors.

As shown in FIG. 10, the information recording and reproducing apparatus 6 is provided with: the dielectric recording medium 1; a probe 50; an electrode 51; an AC (Alternating Current) signal generator 52; a recording signal generator 53; an adder 54; an oscillator 55; a FM (Frequency Modulation) demodulator 56; a signal detection device 57; an inductor L; an inductor La; a capacitance Ca; and a switch SW 1. Obviously, it is provided with other various general functions as the information recording apparatus.

The probe 50 is a hemispherical member having a predetermined radius at the end, and at least its surface has conductivity to apply voltage. In recording information, the voltage is applied to this probe to form the polarization domain in the dielectric recording medium 1. On the other hand, in reproducing, the polarization domain is traced by the probe 50 to pickup the recorded information.

The electrode 51 is intended to conduct to an earth the high frequency electric field applied in the microdomain of the dielectric recording medium 1 when a high frequency signal oscillated at the oscillator 55 is applied to the probe 50.

The AC signal generator 52 is a device for generating an AC signal applied to the probe 50, and it is intended to surely separate a reading signal by applying an alternating electric field to the microdomain of the dielectric recording medium 1 and modulating the reading signal when reading information. Moreover, it biases a recording signal from the recording signal generator 53, applies to the probe 50, and records information. The difference of the capacitance Cs under the probe 50 corresponding to the polarization state causes oscillation frequency to be modulated, and demodulating this enables monitoring whether it is accurately recorded.

When recording information, the SW 1 is connected to a terminal a, and when writing information, the SW 1 is connected to a terminal b.

The recording signal generator 53 converts information to be recorded in the dielectric recording medium 1 to a signal with an appropriate form for recording. A voltage level, a pulse width, and the like are also set optimally and are outputted.

The adder 54 adds the signal for recording from the recording signal generator 53 to the AC signal from the AC signal generator 52 to modulate and apply to the probe 50.

The oscillator 55 generates a signal to modulate the frequency of the recorded information and pickup. The oscillation frequency is set at about 1 GHz, for example.

The inductor La and the capacitance Ca constitute a low cut filter installed to prevent the AC signal of the AC signal generator 52 from interfering with the oscillator 55. The oscillation frequency of the oscillator 55 is about 1 GHz, and even if the AC signal of the AC signal generator 52 is on the order of MHz, a primary LC filter can substantially separate it. Moreover, increasing the frequency is advantageous in view of data transmission rate, and in that case, a filter constant appropriate for it may be chosen.

The inductor L constitutes a resonance circuit with the capacitance Cs corresponding to the polarization domain under the probe 50. The change of the capacitance Cs changes the resonance frequency and causes the oscillation signal of the oscillator 55 to be frequency-modulated. By demodulating this frequency modulation, the recorded information can be read out. Although the capacitance Ca is in the resonance circuit, the capacitance Cs is extremely small, compared to the capacitance Ca, so that the capacitance Cs is mainly a dominant factor with respect to the oscillation frequency.

The FM modulator 56 demodulates the oscillation signal of the oscillator 55 frequency-modulated by the resonance circuit formed by the inductor L and the capacitance Cs. A typical FM detection device is used for this.

The signal detection device 57 synchronously detects the signal demodulated at the FM demodulator 56 by using the AC signal of the AC signal generator 52 as a synchronous signal, thereby reproducing the recorded information.

Next, the record operation of the information recording and reproducing apparatus 6 will be explained. The SW 1 is connected to the terminal b. Firstly, the information to be recorded is inputted in the recording signal generator 53. At the recording signal generator 53, the information to be recorded is converted in a predetermined format appropriate for recording, and it is outputted as a digital recording signal of the set voltage level and the pulse width.

The recording signal from the recording signal generator 53 is applied to the probe 50 through the inductor La, and the polarization domain is formed on a predetermined portion of the dielectric recording medium 1 by the electric field generated between the probe 50 and the conductive thin film 12 of the dielectric recording medium 1, and thus information is recorded.

A record monitor modulates the oscillation frequency of the oscillator 55 by the resonance circuit of the inductor L and the capacitance Cs under the probe 50 corresponding to the polarization domain formed, demodulates this modulated signal at the FM demodulator 56, and synchronously detects it at the signal detection device 57 with the AC signal of the AC signal generator 52 as the synchronous signal.

Next, the reproduction operation of the information recording and reproducing apparatus 6 will be explained. The SW 1 is connected to the terminal a. The AC signal is applied to the probe 50 from the AC signal generator 52. This AC signal becomes the synchronous signal in the synchronous detection. When the probe 50 traces on the polarization domain, the capacitance Cs is detected, the resonance circuit is constructed by the capacitance Cs and the inductor L, and the oscillation frequency of the oscillator 55 is frequency-modulated with the resonance frequency. This frequency-modulated signal is demodulated at the FM demodulator 56, it is synchronously detected at the signal detection device 57 with the AC signal of the AC signal generator 52 as the synchronous signal, and the recorded information is reproduced.

The signal pickuped in this manner is reproduced with the AC signal of the AC signal generator 52 as the synchronous signal, and thus the recorded information is reproduced. Incidentally, with respect to a device used for the synchronous detection, any circuit for synchronizing it with the AC signal of the AC signal generator 52 and reproducing a signal, such as a lock-in amp or the like, is available.

Next, an information recording and reproducing apparatus 7 using the dielectric recording medium 2 provided with the plurality of the sectors 10 will be explained. Incidentally, it differs in having the plurality of sectors 10a to 10c and the respective plurality of probes 50a to 50c from the above mentioned information recording and reproducing apparatus 6, and the explanation on the information recording and reproducing apparatus 6 will be referred with respect to the common structure, as occasion demands.

The probes 50a to 50c are disposed in response to the sectors 10a to 10c of the dielectric recording medium 2. Moreover, there are disposed the AC signal generator, the recording signal generator, the adder, and the SW 1, which are not illustrated, and signals are provided through coils La to Lc for the respective probes 50a to 50c.

With respect to the record operation of the information recording and reproducing apparatus 7, the signals for recording from the recording signal generator are demodulated with different frequencies from the AC signal generator, and they are provided through the coils La to Lc for the probes 50a to 50c. The electric field is generated between the probes 50a to 50c and the conductive thin film 12 of the dielectric recording medium 2 by the voltage provided for the probes 50a to 50c, and the polarization domain is formed on the basis of this. Under the probes 50a to 50c, the capacitances Csa to Csc corresponding to the polarization, and they correspond to the recorded information. Moreover, with respect to the record condition, information on the probes 50a to 50c can be separated to reproduce by modulating the oscillation frequency of the oscillator with the resonance frequency of the resonance circuit provided with the capacitances Csa to Csc, the capacitances Ca to Cc, and the coil L, and synchronizing the signals with the AC signals of the AC signal generator.

Next, with respect to the reproduction operation of the information recording and reproducing apparatus 7, signals with different frequencies from the AC signal generator are provided for the probes 50a to 50c through the coils La to Lc, respectively. When the probes 50a to 50c trace the respective sectors 10a to 10c, the capacitances Csa to Csc corresponding to the polarization under the probes 50a to 50c, i.e. the capacitances Csa to Csc corresponding to the recorded information are detected. By modulating the oscillation frequency of the oscillator with the resonance frequency of the resonance circuit provided with these capacitances Csa to Csc, the capacitances Ca to Cc, and the coil L and synchronizing the signals and synchronizing the signals with the AC signals from the AC signal generator, information pickuped by each of the probes 50a to 50c is separated to reproduce.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

The entire disclosure of Japanese Patent Application No. 2002-024671 filed on Jan. 31, 2002 including the specification, claims, drawings and summary is incorporated herein by reference in its entirety.

What is claimed is:

1. A dielectric recording medium for recording information in a dielectric material or reproducing the information comprising an electric conductor on a surrounding portion of a surface to record or reproduce on, the whole of a back surface, and a side surface of the dielectric material having a predetermined thickness.

2. A dielectric recording medium according to claim 1, wherein
   the dielectric material is divided into a plurality of domains and
   the electric conductor is placed on the surrounding portion of a surface to record or reproduce on, the whole of a back surface, and a side surface in each of the divided domains.

3. A dielectric recording medium according to claim 1, wherein the back surface of the dielectric material adheres to a substrate through the electric conductor placed on the back surface.

4. A dielectric recording medium according to claim 3, wherein the substrate is a silicon substrate.

5. A dielectric recording medium according to claim 3, wherein a way of adhering to the substrate is a conductive paste.

6. A dielectric recording medium according to claim 1, wherein the dielectric material is a ferroelectric material.

7. A dielectric recording medium according to claim 1, wherein the dielectric material is $LiTaO_3$.

* * * * *